(12) United States Patent
Sun et al.

(10) Patent No.: US 11,510,220 B2
(45) Date of Patent: Nov. 22, 2022

(54) LOCATION AWARE SCHEDULING

(71) Applicant: Telefonaktiebolaget LM Ericsson (publ), Stockholm (SE)

(72) Inventors: Wanlu Sun, San Diego, CA (US); Stefano Sorrentino, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 110 days.

(21) Appl. No.: 16/764,148

(22) PCT Filed: Nov. 26, 2018

(86) PCT No.: PCT/SE2018/051212
§ 371 (c)(1),
(2) Date: May 14, 2020

(87) PCT Pub. No.: WO2019/103688
PCT Pub. Date: May 31, 2019

(65) Prior Publication Data
US 2020/0281007 A1 Sep. 3, 2020

Related U.S. Application Data

(60) Provisional application No. 62/590,384, filed on Nov. 24, 2017.

(51) Int. Cl.
*H04L 12/26* (2006.01)
*H04W 72/12* (2009.01)
(Continued)

(52) U.S. Cl.
CPC ....... *H04W 72/1236* (2013.01); *H04W 4/025* (2013.01); *H04W 4/029* (2018.02); *H04W 4/40* (2018.02); *H04W 28/0268* (2013.01)

(58) Field of Classification Search
CPC ..... H04L 47/10; H04L 47/2441; H04L 47/30; H04L 47/32; H04L 12/5693;
(Continued)

(56) References Cited

U.S. PATENT DOCUMENTS 6,449,255 B1 * 9/2002 Waclawsky ............... H04L 9/40
370/252
6,597,906 B1  7/2003 Van Leeuwen et al.
(Continued)

FOREIGN PATENT DOCUMENTS

EP       2879108 A1     6/2015
WO    2015070371 A1     5/2015
WO    2017118996 A2     7/2017

OTHER PUBLICATIONS

Almalkawi et al, Wireless Multimedia Sensor Networks: Current Trends and Future Directions, www.mdpi.com/journal/sensors, OpenAccess-Sensors, ISSN 1424-8220, pp. 6662-6717 (Year: 2010).*
(Continued)

*Primary Examiner* — Phuongchau Ba Nguyen
*Assistant Examiner* — Phuongchau B Nguyen
(74) *Attorney, Agent, or Firm* — Sage Patent Group

(57) ABSTRACT

According to certain embodiments, a method is provided by a distribution node for location aware scheduling. The method includes determining information about a condition associated with a packet. At least one Quality of Service, QoS, parameter is adjusted based on the information about the condition associated with the packet. The at least one QoS parameter is used to schedule the packet for transmission to a receiver based on the at least one adjusted QoS parameter.

10 Claims, 12 Drawing Sheets

(51) Int. Cl.
   *H04W 4/029* (2018.01)
   *H04W 4/40* (2018.01)
   *H04W 4/02* (2018.01)
   *H04W 28/02* (2009.01)

(58) Field of Classification Search
   CPC .......... H04L 47/6275; H04W 72/1236; H04W 4/025; H04W 4/029; H04W 4/40; H04W 28/0268; H04W 4/44; H04W 28/0226; H04W 4/02
   See application file for complete search history.

(56) References Cited

U.S. PATENT DOCUMENTS

| | | | | |
|---|---|---|---|---|
| 6,628,629 | B1 * | 9/2003 | Jorgensen | H04L 69/165 370/468 |
| 6,845,100 | B1 * | 1/2005 | Rinne | H04W 28/0263 370/395.43 |
| 7,693,128 | B2 * | 4/2010 | Yao | H04L 47/564 370/347 |
| 7,934,007 | B2 * | 4/2011 | Wang | H04L 67/06 709/230 |
| 8,842,629 | B2 * | 9/2014 | Qin | H04W 72/0413 370/329 |
| 10,616,743 | B2 * | 4/2020 | Wojcieszak | H04W 4/80 |
| 2004/0090923 | A1 * | 5/2004 | Kan | H04L 43/00 370/252 |
| 2008/0192764 | A1 * | 8/2008 | Arefi | H04L 49/90 370/412 |
| 2010/0208614 | A1 * | 8/2010 | Harmatos | H04L 47/6215 370/253 |
| 2010/0323715 | A1 | 12/2010 | Winters | |
| 2012/0127859 | A1 * | 5/2012 | Ko | H04L 47/629 370/232 |
| 2013/0077486 | A1 * | 3/2013 | Keith | H04L 47/22 370/230.1 |
| 2013/0308464 | A1 * | 11/2013 | Park | H04L 1/08 370/329 |
| 2015/0222549 | A1 * | 8/2015 | Kakadia | H04L 43/0852 370/231 |
| 2017/0018190 | A1 | 1/2017 | Yamasaki et al. | |
| 2017/0272972 | A1 | 9/2017 | Egner et al. | |
| 2019/0364492 | A1 * | 11/2019 | Azizi | H04W 48/16 |

OTHER PUBLICATIONS

Extended European Search Report for European Patent Application No. 18880986.7 dated Jun. 21, 2021, 9 pages.
PCT International Search Report and Written Opinion dated Feb. 22, 2019 for International Application No. PCT/SE2018/051212, 13 pages.

* cited by examiner

LOCATION AWARE SCHEDULING

CROSS-REFERENCE TO RELATED APPLICATIONS

This application is a 35 U.S.C § 371 national stage application for International Application No. PCT/SE2018/051212, entitled "LOCATION AWARE SCHEDULING", filed on Nov. 26, 2018, which claims priority to U.S. Provisional Patent Application No. 62/590,384, filed on Nov. 24, 2017, the disclosures and contents of which are hereby incorporated by reference in their entireties.

TECHNICAL FIELD

Certain embodiments of the present disclosure relate, in general, to wireless communications and more particularly to location aware scheduling.

BACKGROUND

Wireless Networks typically differentiate different types of traffic by assigning appropriate Quality of Service (QoS) parameters to different services (e.g., File Transfer Protocol (FTP), Voice over Internet Protocol (VoIP), . . . ). Each QoS class is typically associated to network Key Performance Indicators (KPIs) in terms of latency, throughput, relative priority, reliability, etc. In 5G/NR, the concept of QoS is being extended by the use of "flows" which differentiate different traffic QoS parameters within a common radio bearer.

Some network services use geocast delivery where data is distributed in limited geographical areas. A typical example is high definition (HD) map dissemination for Voice-to-Everything (V2X) services. FIG. 1 illustrates some example types of V2X communications services from the application point of view. One such type of communication includes vehicle-to-vehicle (V2V) communication. V2V communication includes any communication between vehicles using V2V applications and is predominantly broadcast-based. V2V may be realized by either direct communication between the devices in the respective vehicles, or via infrastructure such as a cellular network. An example of V2V is the transmission of a cooperative awareness message (CAM) with vehicle status information (such as position, direction and speed) transmitted to other vehicles in the proximity repeatedly (every 100 ms to 1 s). Another example is the transmission of a decentralized environmental notification message (DENM), which is an event-triggered message to alert vehicles. These two examples are taken from the ETSI Intelligent Transport Systems (ITS) specification of V2X applications, see also 2.1.2, which also specifies the conditions under which the messages are generated. A main characteristic of V2V applications is the tight requirements on latency that can vary from 20 ms (for pre-crash warning messages) to 100 ms for other road safety services.

Another type of V2X communication is vehicle-to-infrastructure (V2I) communication. V2I communication includes any communication between vehicles and a Roadside Unit (RSU). The RSU is a stationary transportation infrastructure entity which communicates with vehicles in its proximity. An example of V2I is transmission of speed notifications from the RSU to vehicles, as well as queue information, collision risk alerts, curve speed warnings. Due to the safety related nature of V2I, delay requirements are similar to V2V requirements.

Yet another type of V2X communication is vehicle-to-pedestrian (V2P) communication. V2P communication includes any communication between vehicles and vulnerable road users, such as pedestrians, using V2P applications. V2P typically takes place between distinct vehicles and pedestrians either directly or via infrastructure such as cellular network.

Still another type of V2X communication is vehicle-to-network (V2N) communication. V2N communication includes any communication between a vehicle and a centralized application server (or an ITS Traffic Management Center) both using V2N applications, via infrastructure (such as a cellular network). One example is a bad road condition warning sent to all vehicles in a wide area, or traffic flow optimization in which V2N application suggests speeds to vehicles and coordinates traffic lights. Therefore, V2N messages are supposed to be controlled by a centralized entity (i.e. the Traffic Management Center) and provisioned to vehicles in a large geographical area, rather than in a small area. Additionally, unlike V2V/V2I, latency requirements are more relaxed in V2N because it is meant to be used for non-safety purposes, e.g. is latency requirement is typically considered.

In vehicular V2X communications, a timely HD map is a need for safer and more comfortable semi- or fully autonomous driving experience. In a practical way, an off-board, system such as, for example, an application server, precisely aggregates and collects context information, such as vehicles, pedestrians, road structure reference objects and so forth from different sources, and then uses the information to construct an HD map. The HD map is distributed to vehicles or road users in real-time, which is then used for an optimal route selection or to complete critical maneuvers in a safe and comfortable manner. To acquire the HD map, an application server typically gathers all the information from different sources and constructs an HD map. The HD map is divided into sectors or polygons, which are then disseminated to the vehicles in the geographical areas corresponding to the sectors or polygons. The surface of the geographical area depends on the driving environment, which may include highway, urban conditions, and other factors.

However, there currently exist certain challenges. For example, traffic load in the network can vary greatly over time. Where a large amount of data requires reliable and urgent delivery, the scheduler has little freedom in assigning resources and system performance is degraded.

SUMMARY

Certain aspects of the present disclosure and their embodiments may provide solutions to these or other challenges. Specifically, various methods and protocols are disclosed for adjusting individual packet quality of service (QoS) provisioning based on position-related information.

According to certain embodiments, a method is provided by a distribution node for location aware scheduling. The method includes determining information about a condition associated with a packet. At least one QoS parameter is adjusted based on the information about the condition associated with the packet. The at least one QoS parameter is used to schedule the packet for transmission to a receiver based on the at least one adjusted. QoS parameter.

According to certain embodiments, a distribution node for location aware scheduling includes memory operable to store instructions and processing circuitry operable to execute the instructions to cause the distribution node to determine information about a condition associated with a packet and adjust at least one QoS parameter based on the information about the condition associated with the packet. The processing circuitry is further operable to execute the instructions to cause the distribution node to use the at least one QoS parameter to schedule the packet for transmission to a receiver based on the at least one adjusted QoS parameter.

According to certain embodiments, a method is provided by a distribution node for location aware scheduling. The method includes determining position-related information associated with at least one of a scheduled packet and a receiver of the scheduled packet and adjusting a packet delivery strategy associated with the scheduled packet based on the position-related information.

According to certain embodiments, a distribution node for location aware scheduling includes memory operable to store instructions and processing circuitry operable to execute the instructions to cause the distribution node to determine position-related information associated with at least one of a scheduled packet and a receiver of the scheduled packet and adjust a packet delivery strategy associated with the scheduled packet based on the position-related information.

Certain embodiments may provide one or more of the following technical advantage(s). As an example, an advantage of certain embodiments may allow the network to schedule packets based on the service requirements that are specific for that packet. Accordingly, an advantage may be that a scheduler optimizes its behavior specifically for each packet, rather than based on generic QoS requirements that may be unnecessarily stringent. Still another advantage may be that increased system efficiency leads to higher network capacity and reduced operation cost.

Certain embodiments may include none, some, or all of these advantages. Certain embodiments may include other advantages, as would be understood by a person having ordinary skill in the art.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
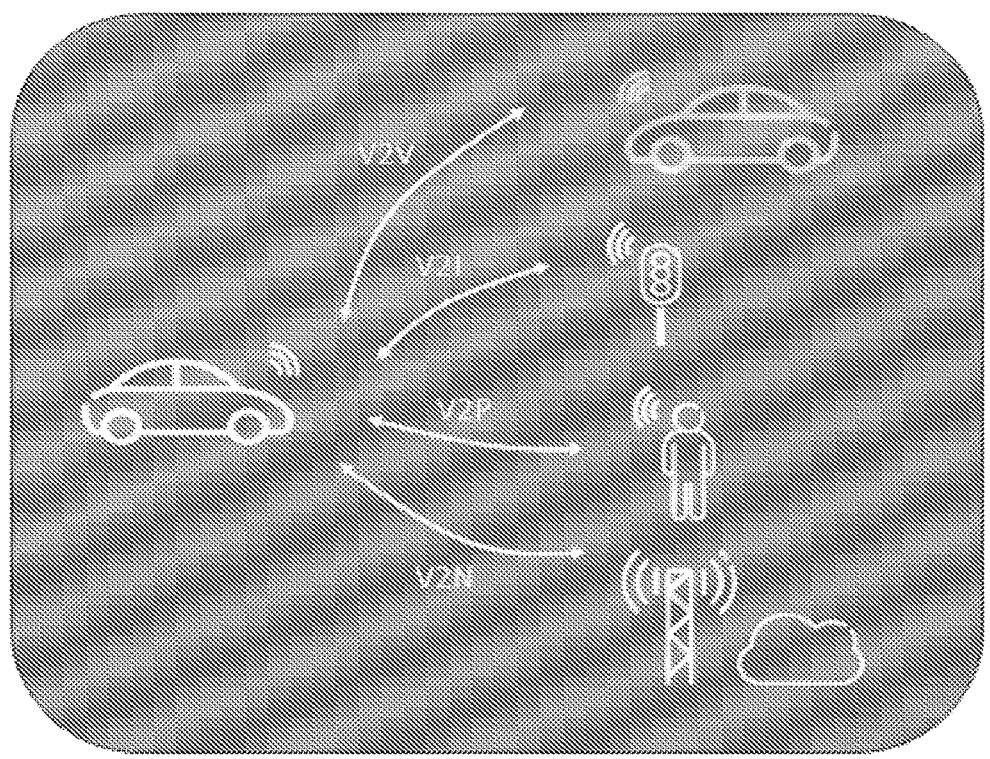
FIG. 1 illustrates some example types of V2X communications services from the application point of view.

Certain embodiments may include functionality for adjusting individual packet Quality of Service (QoS) provisioning based on position-related information. According to certain embodiments, for example, a condition may be defined that must be fulfilled before a certain packet is delivered by a network. Such information may be used in a distribution node to adjust the QoS parameters and/or packet priority and/or packet delivery strategy associated with the data packet. In a particular embodiment, for example, the choice of bearer or flow may be adjusted.

According to certain embodiments, a data packet may be readily available in a distribution node. The data packet may need to be delivered to another node by use of a communication network before a certain condition is met. In a particular embodiment, for example, the data packet may consist of data from a map or of a traffic-related notification.

As used herein, the term "distribution node" refers to a generic node that implements at least part of the invention. Such node may be for example an application server, a network node in the core, a radio node, a scheduler, a device, etc.

The above-described condition can be defined in arbitrary ways, but some examples are provided below.

For example, in a particular embodiment, information about the condition is used by the distribution node to adjust the QoS parameters associated to the data packet. Such QoS parameters may be used directly by the distribution node itself for its own resource allocation procedures, or they may be forwarded to other nodes by use of any signaling or protocol, potentially associated to the data packet. In one example, one of several flows or one of several radio bearers is selected and used for a certain packet, according to the above procedure.

In a particular embodiment, the condition may consist of delivering a data packet before a vehicle approaches a certain geographical area that is relevant for the data packet. Specifically, for example, the condition may include delivering information relative to a map before the vehicle approaches the area covered by the map.

For example, the network may derive packet-specific QoS requirements (e.g., maximum delivery latency) by comparing the packet geographical area that is relevant for the packet with the position of the intended receiver of the packet. Additional mobility related parameters can be taken into account. For example, the delivery latency (or any other QoS parameter such as reliability, in a particular embodiment) can be based on the expected time for the intended receiver to reach the geographical area of relevance for the packet.

In one example, a scheduler, which may potentially be implementing a resource selection protocol, selects resources for transmission of the data packet within a future time window where the time position of such window is a function of the expected time for the intended receiver to reach the geographical area of relevance for the packet.

In another example, the condition consists of delivering a data packet (e.g., a Cooperative Awareness Message (CAM)) before a vehicle has moved over a certain distance relative to when the data packet was generated or relative to the position when the packet reached the distribution node.

However, the above described conditions are merely provided as example conditions, which may be replaced with or combined with other conditions such as other QoS requirements, timers, etc.

According to various embodiments, the mapping of conditions to QoS parameters may be explicit or implicit in the scheduler. Further, the mapping may be implemented in any node in or outside the network, as part of any protocol level.

The proposed method is applicable to any wireless communication link, including downlink, uplink and sidelink.

According to certain embodiments, the information associated with the condition may be signaled across layers of the protocol stack using any protocol.

Additionally, the techniques may be implemented by setting up a specific bearer QoS Class Identifier (QCI) description, which does not include explicit latency constraints. In such cases, the latency target for each packet is derived individually per packet.

Particular embodiments are described in FIGS. 2-13 of the drawings, like numerals being used for like and corresponding parts of the various drawings.

Figure 2:
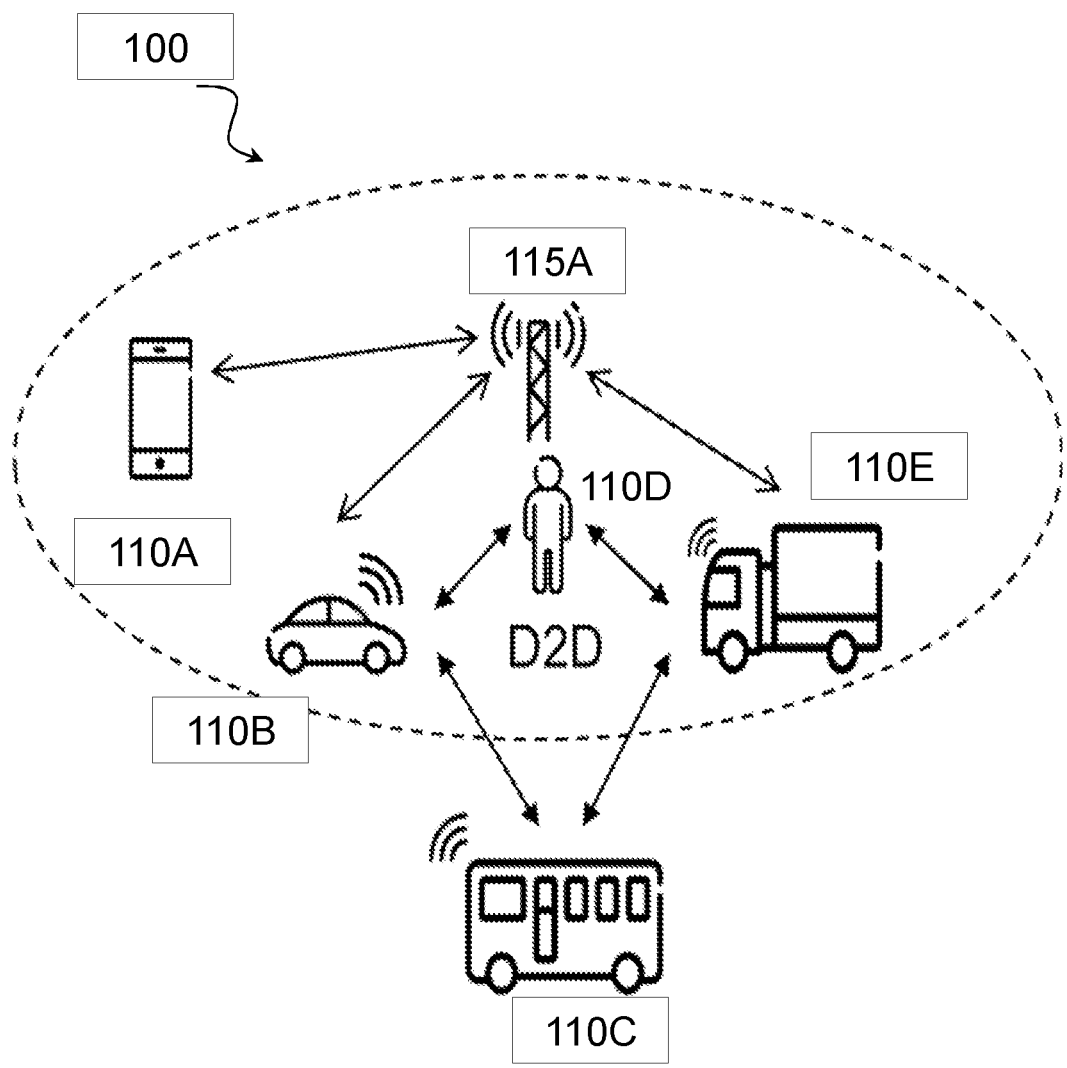
FIG. 2 illustrates an embodiment of a network, according to certain embodiments.

FIG. 2 is a block diagram illustrating an embodiment of a network 100, in accordance with certain embodiments. Network 100 includes one or more wireless device(s) 110 (which may be interchangeably referred to as user equipment (UEs) 110) and network node(s) 115 (which may be interchangeably referred to as eNodeBs (eNBs) 115). More particularly, wireless device 110A is a smart phone, wireless devices 110B-D are vehicle wireless devices (i.e., a wireless device installed or otherwise integrated into a vehicle), and wireless device 110E is a pedestrian having a wireless device 110, such as, for example, a smart phone. Wireless devices 110 may communicate with network nodes 115, or with one or more other wireless devices 110 over a wireless interface. For example, wireless device 110A, 110B, and 110D may transmit wireless signals to network node 115 and/or receive wireless signals from network node 115. Wireless devices 110 may also transmit wireless signals to other wireless devices 110 and/or receive wireless signals from other wireless devices 110. For example, wireless devices 110B, 110C, 110D, and 110E may communicate using D2D communication, PC5 communication, and/or DSRC communication. The wireless signals may contain voice traffic, data traffic, control signals, and/or any other suitable information. In some embodiments, an area of wireless signal coverage associated with a network node 115 may be referred to as a cell.

In certain embodiments, network node 115 may interface with a radio network controller. The radio network controller may control network node 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node (not depicted) may manage the establishment of communication sessions and various other functionalities for wireless device 110. Wireless device 110 may exchange certain signals with the core network node using the non-access stratum layer. In non-access stratum signaling, signals between wireless device 110 and the core network node may be transparently passed through the radio access network. In certain embodiments, network node 115 may interface with one or more network nodes over an internode interface.

Example embodiments of network 100 may include one or more wireless devices 110, and one or more different types of network nodes capable of communicating (directly or indirectly) with wireless devices 110. In some embodiments, wireless devices may be referred to as user equipment (UE), vehicle wireless device, and/or vehicle UE. The terms, UE, wireless device, vehicle UE, and vehicle wireless device are to be considered non-limiting terms that can be any type of wireless device capable of communicating with network nodes 115 or another wireless device 110 over radio signals. Wireless device 110 may also be a radio communication device, target device, D2D UE, machine-type-communication UE or UE capable of machine to machine communication (M2M), low-cost and/or low-complexity wireless device, a sensor equipped with wireless device, Tablet, mobile terminals, smart phone, laptop embedded equipped (LEE), laptop mounted equipment (LME), USB dongles, Customer Premises Equipment (CPE), etc. Wireless device 110 may operate under either normal coverage or enhanced coverage with respect to its serving cell. The enhanced coverage may be interchangeably referred to as extended coverage. Wireless device 110 may also operate in a plurality of coverage levels (e.g., normal coverage, enhanced coverage level 1, enhanced coverage level 2, enhanced coverage level 3 and so on). In some cases, wireless device 110 may operate in an out-of-coverage scenario.

Also, in some embodiments, generic terminology, "network node" is used. It can be any kind of network node, which may comprise a road-side unit (RSU), a base station (BS), radio base station, Node B, base station (BS), multi-standard radio (MSR) radio node such as MSR BS, evolved Node B (eNB), network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME etc), O&M, OSS, SON, positioning node (e.g., E-SMLC), MDT, or any suitable network node.

The terminology such as network node and wireless device should be considered non-limiting and does in particular not imply a certain hierarchical relation between the two in general "eNodeB" could be considered as device 1 and "UE" device 2, and these two devices communicate with each other over some radio channel.

Although FIG. 2 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). Any one of network node 115, wireless device 100, a network node in the core, a radio node, a scheduler, a device, or other type of network node may comprise a distribution node for performing the techniques for location aware scheduling as described herein. Example embodiments of wireless device 110, network node 115, and other network and/or distribution nodes (such as radio network controller or core network node) are described in more detail below with respect to FIGS. 7, 8, and 9, respectively.

Furthermore, although certain embodiments may be described as implemented in a 5G NR network, the embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, the various embodiments described herein may be applicable to LTE, LTE evolution, LTE-Advanced, UMTS, HSPA, GSM, cdma2000, WiMax, WiFi, another suitable radio access technology, or any suitable combination of one or more radio access technologies, including 5G standards. Although certain embodiments may be described in the context of V2X applications, the various embodiments may be advantageously applied to other applications. Furthermore, although certain embodiments may be described in the context of wireless transmissions in the downlink, the present disclosure contemplates that the various embodiments are equally applicable in the uplink.

As described above, V2X communication may include any combination of direct communication between vehicles, pedestrians, and infrastructure. FIG. 2 illustrates a variety of V2X scenarios in which the various embodiments of the present disclosure may be applied. As an example of vehicle-to-infrastructure (V2I) communication, wireless device 110A, 110B, and 110D may communicate wirelessly with network node 115. As an example of vehicle-to-pedestrian (V2P) communication, wireless devices 110B and 110D may communicate with a pedestrian having a wireless device 110E. As an example of vehicle-to-vehicle (V2V) communication, wireless devices 110B, 110C, and 110D may communicate wirelessly with each other.

Figure 3:
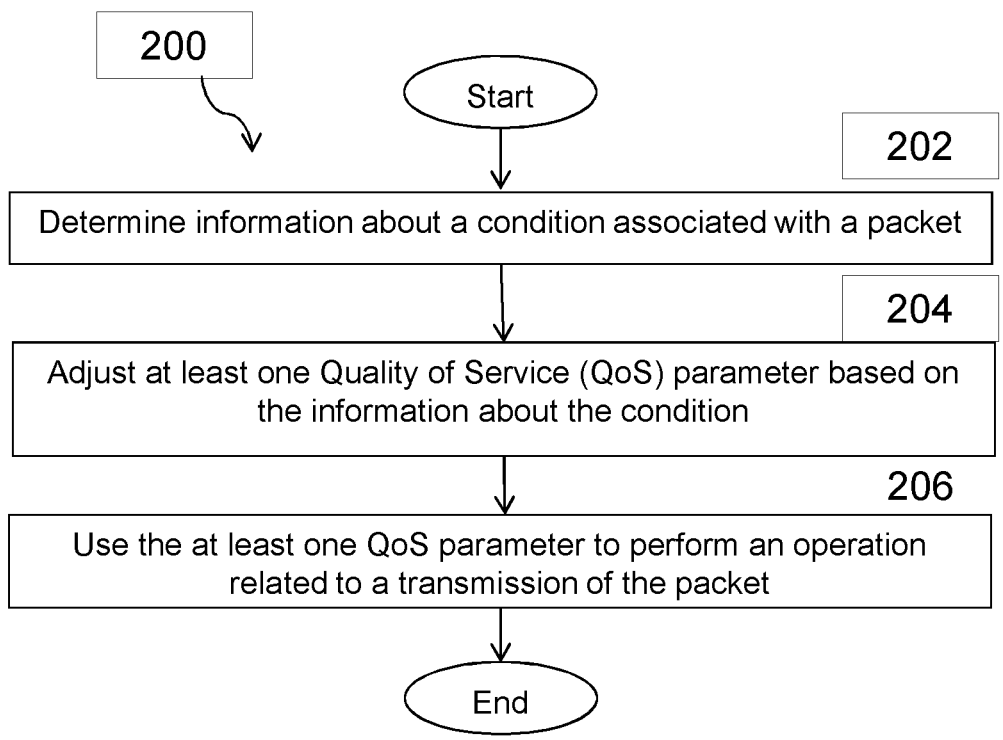
FIG. 3 illustrates an example method by a distribution node for location aware scheduling, according to certain embodiments.

FIG. 3 illustrates an example method 300 by a distribution node for location aware scheduling, according to certain embodiments. In a particular embodiment, the distribution node may include a wireless device 110. In another embodiment, the distribution node may include a network node 115. The method begins at step 202 when the distribution node determines information about a condition associated with a packet. At step 204, the distribution node adjusts at least one Quality of Service (QoS) parameter based on the information about the condition. The adjusted parameter is used at step 204 to perform an operation related to a transmission of the packet.

According to a particular embodiment using the at least one QoS parameter may include scheduling the packet for transmission to a receiver based on the at least one adjusted QoS parameter. In another particular embodiment, using the at least one QoS parameter may include performing a resource allocation procedure based on the at least one adjusted QoS parameter. In still another embodiment, using the at least one QoS parameter may include transmitting the at least one adjusted QoS parameter to another radio node. In yet another embodiment, using the at least one QoS parameter may include selecting at least one radio bearer for the packet based on the at least one adjusted QoS parameter.

According to certain embodiments, the condition may include delivering the packet before a vehicle approaches a geographical area that is relevant for the data packet and adjusting the at least one QoS parameter may include deriving a packet-specific QoS requirement by comparing the geographical area with a position of an intended receiver of the packet. In a particular embodiment, the packet-specific QoS requirement relates to a maximum delivery latency or reliability.

According to other embodiments, the condition comprises delivering the packet at an expected time for an intended receiver to reach a geographical area that is relevant to the packet and using the at least one QoS parameter may include selecting at least one resource for transmission of the packet within a future time window that is a function of the expected time for the intended receiver to reach the geographical area that is relevant to the packet.

According to still other embodiments, the condition may include delivering the packet before a vehicle has moved over a certain distance relative to when the packet was generated or relative to a position when the packet reached the radio node.

Certain embodiments may comprise more or fewer actions, and the actions may be performed in any suitable order.

Figure 4:
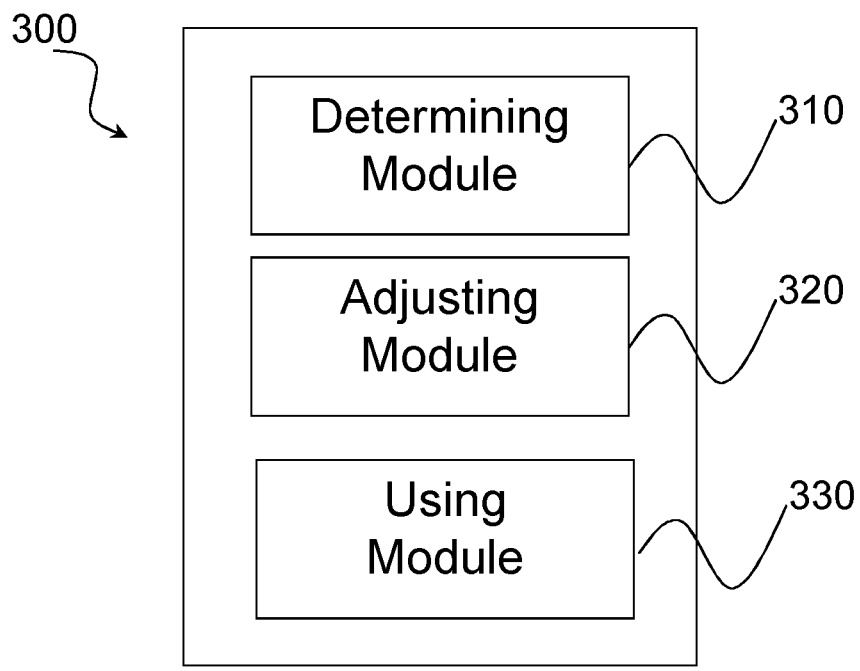
FIG. 4 illustrates an example virtual computing device for location aware scheduling, according to certain embodiments.

In certain embodiments, the method for location aware scheduling may be performed by a virtual computing device. FIG. 4 illustrates an example virtual computing device 300 for location aware scheduling, according to certain embodiments. In certain embodiments, virtual computing device 300 may include modules for performing steps similar to those described above with regard to the method illustrated and described in FIG. 3. For example, virtual computing device 300 may include a determining module 310, an adjusting module 320, a using module 330, and any other suitable modules for location aware scheduling. In some embodiments, one or more of the modules may be implemented using processing circuitry such as that described above with regard to FIGS. 9 and/or 10. In certain embodiments, the functions of two or more of the various modules may be combined into a single module.

The determining module 310 may perform certain of the determining functions of virtual computing device 300. For example, in a particular embodiment, determining module 310 may determine information about a condition associated with a packet.

The adjusting module 320 may perform certain of the adjusting functions of virtual computing device 300. For example, in a particular embodiment, adjusting module 320 may adjust at least one QoS parameter based on the information about the condition.

The using module 330 may perform certain of the using functions of virtual computing device 300. For example, in a particular embodiment, using module 330 may use the adjusted QoS parameter to perform an operation related to a transmission of the packet.

Other embodiments of virtual computing device 300 may include additional components beyond those shown in FIG. 4 that may be responsible for providing certain aspects of the distribution node's functionality, including any of the functionality described above and/or any additional functionality (including any functionality necessary to support the solutions described above). The various different types of the distribution node may include components having the same physical hardware but configured (e.g., via programming) to support different radio access technologies, or may represent partly or entirely different physical components.

Figure 5:
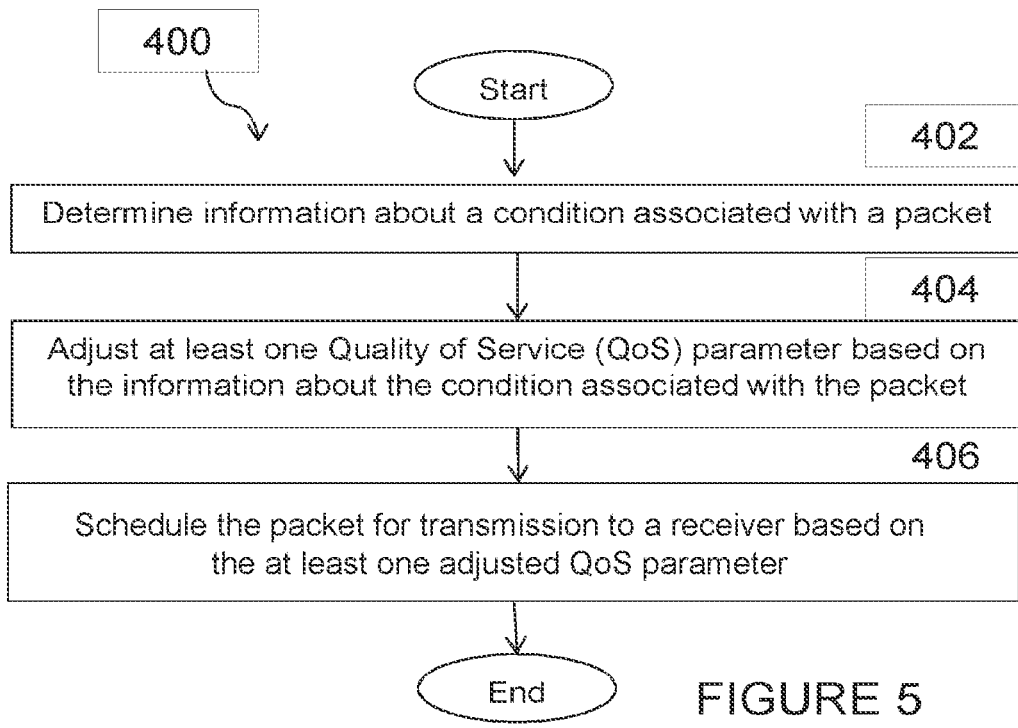
FIG. 5 illustrates another example method by a distribution node for location aware scheduling, according to certain embodiments.

FIG. 5 illustrates another example method 400 by a distribution node for location aware scheduling, according to certain embodiments. In a particular embodiment, the distribution node may include a wireless device 110. In another embodiment, the distribution node may include a network node 115.

The method begins at step 402 when the distribution node determines information about a condition associated with a packet. At step 404, the distribution node adjusts at least one QoS parameter based on the information about the condition associated with the packet. In a particular embodiment, for example, the condition may be delivering the packet to the receiver before a vehicle associated with the receiver approaches a geographical area that is relevant to the packet, and adjusting the at least one QoS parameter may include deriving a packet-specific QoS requirement by comparing the geographical area that is relevant for the packet with a current position of the receiver of the packet. In a particular embodiment, for example, the packet-specific QoS requirement relates to a maximum delivery latency or reliability.

Additionally, or alternatively, the condition may be delivering the packet at a time when the receiver is expected to reach a geographical area that is relevant to the packet, and using the at least one adjusted QoS parameter to schedule the packet for transmission to a receiver based on the at least one QoS parameter may include selecting at least one resource for transmission of the packet within a future time window that is a function of the time when the receiver is expected to reach the geographical area that is relevant to the packet.

In a particular embodiment, the condition may additionally or alternatively include delivering the packet before a vehicle in which the receiver is traveling has moved over a certain distance relative to when the packet was generated or relative to a position when the packet reached a network node.

At step 406, the distribution node uses the at least one QoS parameter to schedule the packet for transmission to a receiver based on the at least one adjusted QoS parameter. In a particular embodiment, for example, the distribution node may perform a resource allocation procedure based on the at least one adjusted QoS parameter.

In a particular embodiment, when using the at least one QoS parameter to schedule the packet for transmission, the distribution node may select at least one radio bearer for the packet based on the at least one adjusted QoS parameter. Additionally, or alternatively, the distribution node may select at least one flow for the packet based on the at least one adjusted QoS parameter.

In a particular embodiment, the method may further include the distribution node transmitting the at least one adjusted QoS parameter to another radio node.

In a particular embodiment, the packet may include at least one of a map, a traffic-related notification, a CAM comprising vehicle status information, and a DENM related to an event.

Certain embodiments may comprise more or fewer actions, and the actions may be performed in any suitable order.

Figure 6:
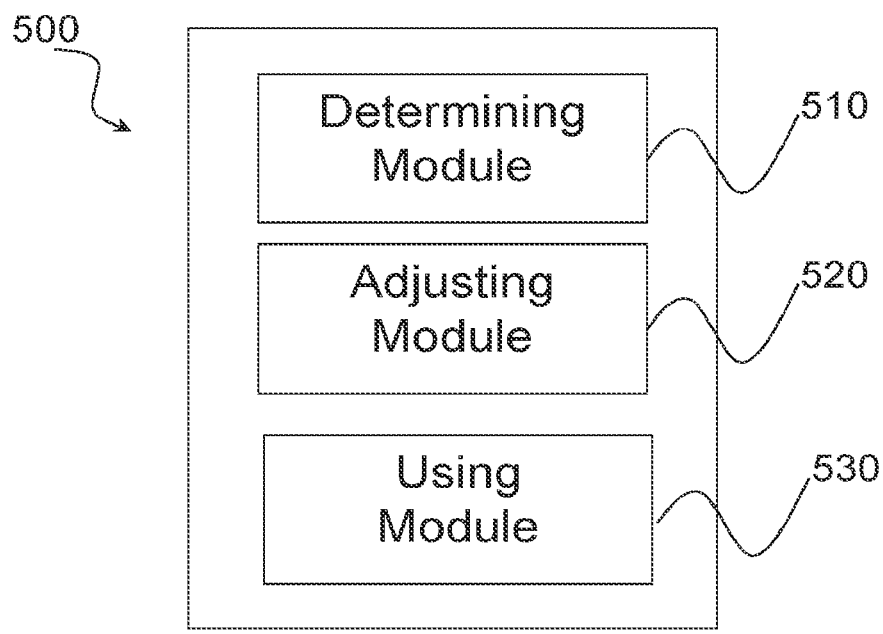
FIG. 6 illustrates another example virtual computing device for location aware scheduling, according to certain embodiments.

In certain embodiments, the method for location aware scheduling may be performed by a virtual computing device. FIG. 6 illustrates an example virtual computing device 500 for location aware scheduling, according to certain embodiments. In certain embodiments, virtual computing device 500 may include modules for performing steps similar to those described above with regard to the method illustrated and described in FIG. 4. For example, virtual computing device 500 may include a determining module 510, adjusting module 520, using module 530, and any other suitable modules for location aware scheduling. In some embodiments, one or more of the modules may be implemented using processing circuitry such as that described below with regard to FIGS. 9 and/or 10. In certain embodiments, the functions of two or more of the various modules may be combined into a single module.

The determining module 510 may perform certain of the determining functions of virtual computing device 500. For example, in a particular embodiment, determining module 510 may determine information about a condition associated with a packet.

The adjusting module 520 may perform certain of the adjusting functions of virtual computing device 500. For example, in a particular embodiment, adjusting module 520 may adjust at least one QoS parameter based on the information about the condition associated with the packet.

The using module 530 may perform certain of the using functions of virtual computing device 500. For example, in a particular embodiment, using module 530 may use the at least one QoS parameter to schedule the packet for transmission to a receiver based on the at least one adjusted QoS parameter.

Other embodiments of virtual computing device 500 may include additional components beyond those shown in FIG. 6 that may be responsible for providing certain aspects of the distribution node's functionality, including any of the functionality described above and/or any additional functionality (including any functionality necessary to support the solutions described above). The various different types of the distribution node may include components having the same physical hardware but configured (e.g., via programming) to support different radio access technologies, or may represent partly or entirely different physical components.

Figure 7:
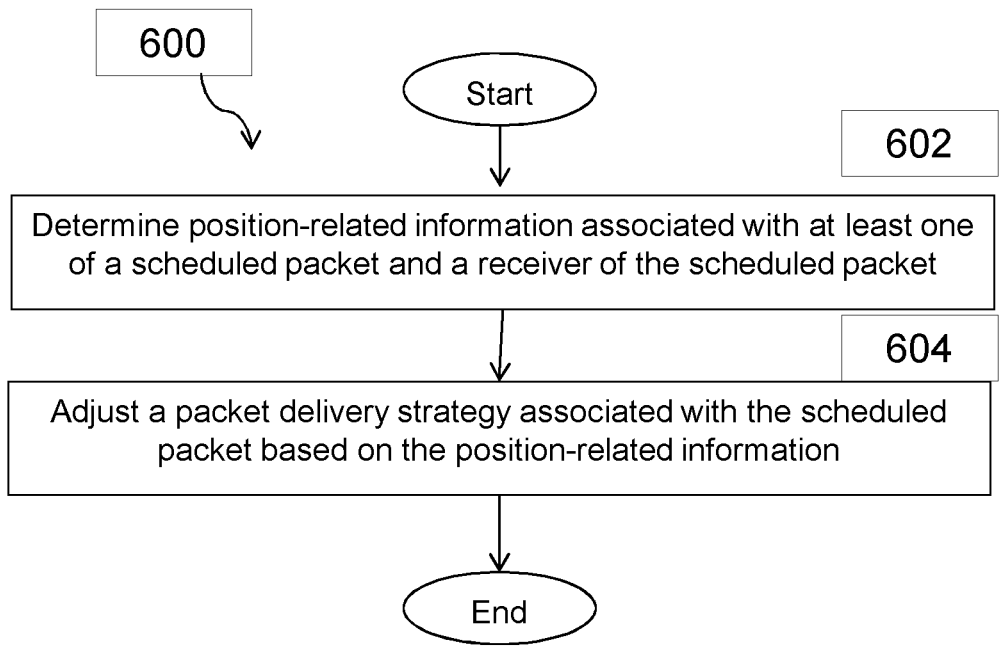
FIG. 7 illustrates another example method by a distribution node for location aware scheduling, according to certain embodiments.

FIG. 7 illustrates another example method 600 by a distribution node for location aware scheduling, according to certain embodiments. In a particular embodiment, the distribution node may include a wireless device 110. In another embodiment, the distribution node may include a network node 115.

The method begins at step 602 when the distribution node determines position-related information associated with at least one of a scheduled packet and a receiver of the scheduled packet. For example, in a particular embodiment, the position-related information associated with the scheduled packet comprises a packet-specific QoS requirement that the scheduled packet be delivered to the receiver before a vehicle in which the receiver is travelling approaches a geographical area that is relevant to the scheduled packet.

In a particular embodiment, the packet-specific QoS requirement relates to a maximum delivery latency or reliability. Additionally or alternatively, the position-related information associated with the receiver of the scheduled packet may include a current position of the receiver of the scheduled packet.

At step 604, the distribution node adjusts a packet delivery strategy associated with the scheduled packet based on the position-related information. For example, in a particular embodiment, the packet delivery strategy associated with the scheduled packet may be adjusted based on a comparison of the requirement that the scheduled packet be delivered to the receiver before the vehicle approaches the geographical area to the current position of the receiver of the scheduled packet.

In particular embodiment, the position-related information associated with the receiver of the scheduled packet may include a time when the receiver is expected to reach a geographical area that is relevant to the scheduled packet, and the distribution node may select at least one resource for transmission of the scheduled packet within a future time window that is a function of the time when the receiver is expected to reach the geographical area that is relevant to the packet.

In a particular embodiment, the position-related information associated with the scheduled packet comprises a packet-specific QoS requirement that the scheduled packet be delivered to the receiver before a vehicle in which the receiver is traveling has moved over a certain distance.

In a particular embodiment, when adjusting the packet delivery strategy associated with the scheduled packet, the distribution node may perform a resource allocation procedure based on the based on the position-related information.

In a particular embodiment, when adjusting the packet delivery strategy associated with the scheduled packet, the distribution node may select at least one radio bearer for the scheduled packet based on the position-related information. Additionally or alternatively, the distribution node may select at least one flow for the scheduled packet based on the position-related information.

In a particular embodiment, the method may further include the distribution node transmitting the adjusting the packet delivery strategy to another radio node.

In a particular embodiment, the scheduled packet comprises at least one of a map, a traffic-related notification, a CAM comprising vehicle status information, and a DENM related to an event.

Certain embodiments may comprise more or fewer actions, and the actions may be performed in any suitable order.

Figure 8:
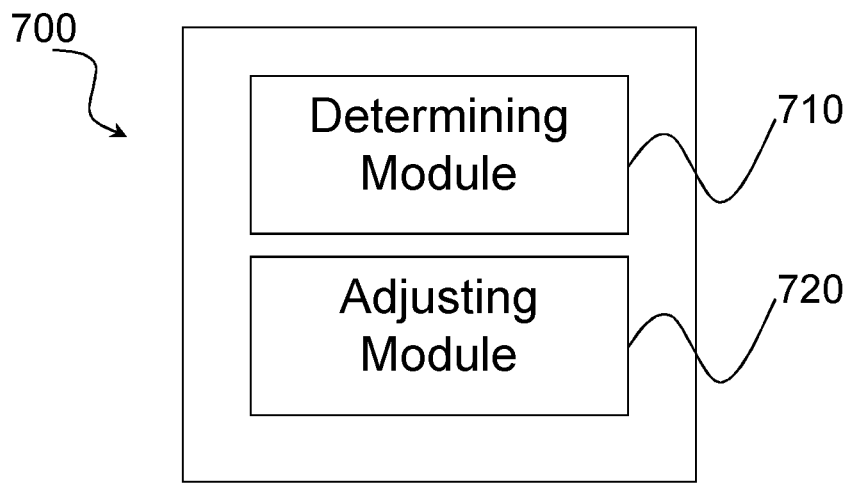
FIG. 8 illustrates another example virtual computing device for location aware scheduling, according to certain embodiments.

In certain embodiments, the method for location aware scheduling may be performed by a virtual computing device. FIG. 8 illustrates an example virtual computing device 700 for location aware scheduling, according to certain embodiments. In certain embodiments, virtual computing device 700 may include modules for performing steps similar to those described above with regard to the method illustrated and described in FIG. 7. For example, virtual computing device 700 may include a determining module 710, adjusting module 720, and any other suitable modules for location aware scheduling. In some embodiments, one or more of the modules may be implemented using processing circuitry such as that described below with regard to FIGS. 9 and/or 10. In certain embodiments, the functions of two or more of the various modules may be combined into a single module.

The determining module 710 may perform certain of the determining functions of virtual computing device 700. For example, in a particular embodiment, determining module 710 may determine position-related information associated with at least one of a scheduled packet and a receiver of the scheduled packet.

The adjusting module 720 may perform certain of the adjusting functions of virtual computing device 700. For example, in a particular embodiment, adjusting module 720 may adjust a packet delivery strategy associated with the scheduled packet based on the position-related information.

Other embodiments of virtual computing device 700 may include additional components beyond those shown in FIG. 8 that may be responsible for providing certain aspects of the distribution node's functionality, including any of the functionality described above and/or any additional functionality (including any functionality necessary to support the solutions described above). The various different types of the distribution node may include components having the same physical hardware but configured (e.g., via programming) to support different radio access technologies, or may represent partly or entirely different physical components.

Figure 9:
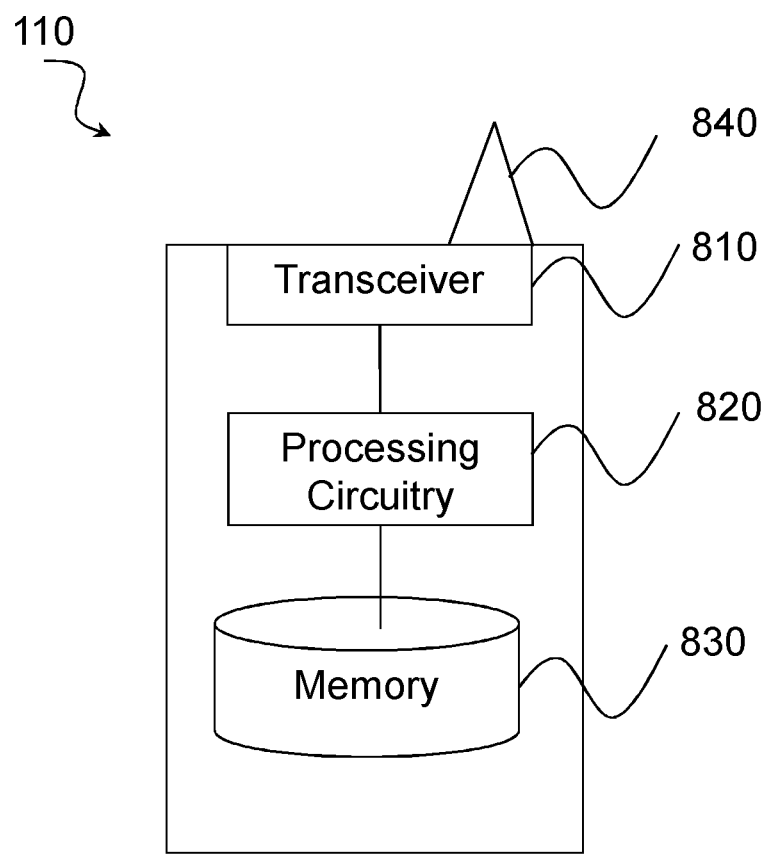
FIG. 9 illustrates an example wireless device for location aware scheduling, according to certain embodiments.

FIG. 9 is a block schematic of an exemplary wireless device 110 for location aware scheduling, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, an MTC device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 710, processing circuitry 720, and memory 740. In some embodiments, transceiver 710 facilitates transmitting wireless signals to and receiving wireless signals from network node 115 (e.g., via antenna 740), processing circuitry 720 (e.g., which may include one or more processors) executes instructions to provide some or all of the functionality described above as being provided by wireless device 110, and memory 740 stores the instructions executed by processing circuitry 720.

Processing circuitry 720 may include any suitable combination of hardware and software implemented in one or more modules to execute instructions and manipulate data to perform some or all of the described functions of wireless device 110, such as the functions of UE 110 (i.e., wireless device 110) described herein. In some embodiments, processing circuitry 720 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 740 is generally operable to store instructions, such as a computer program, software, an application including one or more of logic, rules, algorithms, code, tables, etc. and/or other instructions capable of being executed by a processor. Examples of memory 740 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 720.

Other embodiments of wireless device 110 may optionally include additional components beyond those shown in FIG. 9 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processing circuitry 720. Input devices include mechanisms for entry of data into wireless device 110. For example, input devices may include input mechanisms, such as a microphone, input elements, a display, etc. Output devices may include mechanisms for outputting data in audio, video, and/or hard copy format. For example, output devices may include a speaker, a display, etc.

Figure 10:
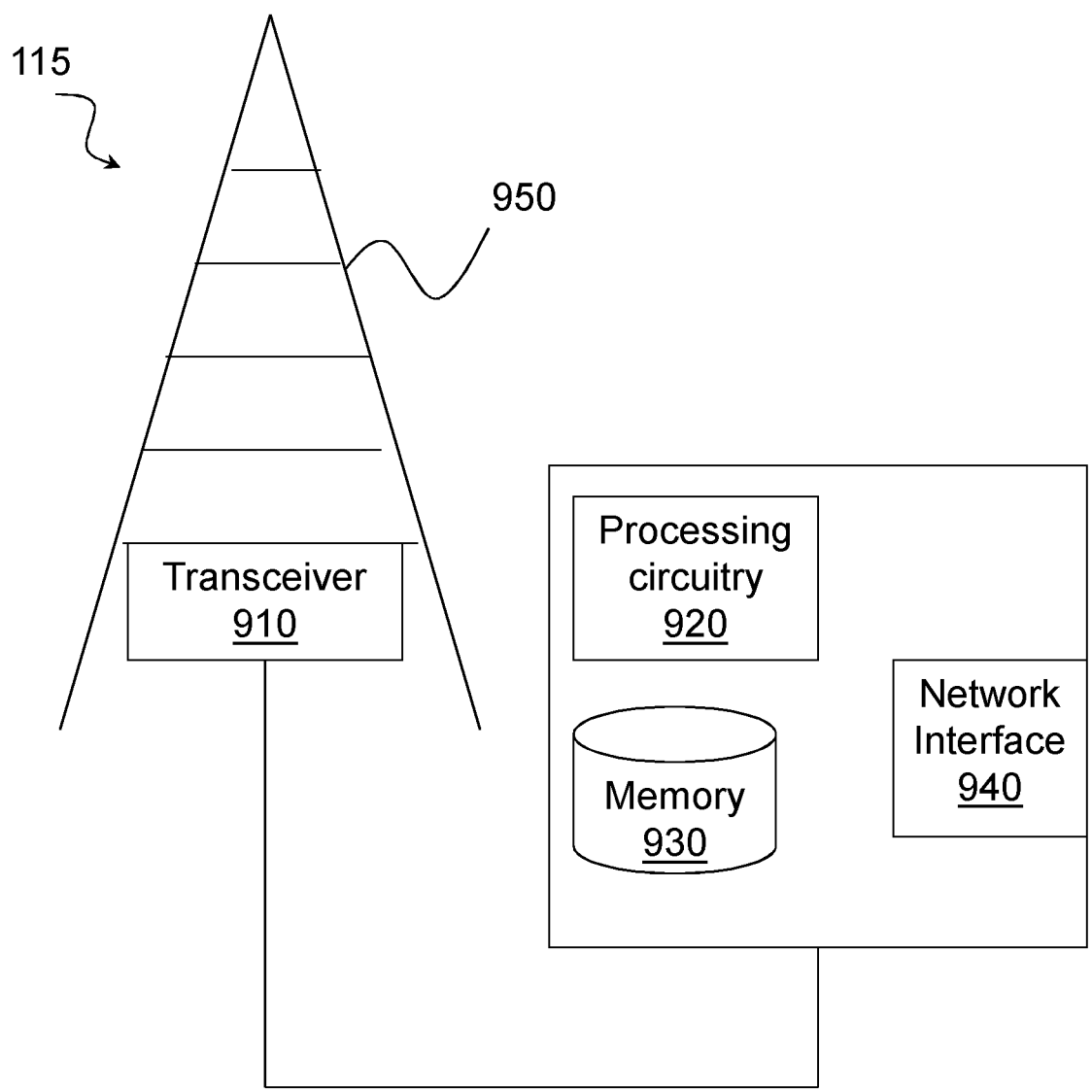
FIG. 10 illustrates an example network node for location aware scheduling, according to certain embodiments.

FIG. 10 illustrates an example network node 115 for location aware scheduling, in accordance with certain embodiments. Network node 115 may be any type of radio network node or any network node that communicates with a UE and/or with another network node. Examples of network node 115 include an gNB, eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogeneous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 710, processing circuitry 720 (e.g., which may include one or more processors), memory 730, and network interface 740. In some embodiments, transceiver 710 facilitates transmitting wireless signals to and receiving wireless signals from wireless device 110 (e.g., via antenna 750), processing circuitry 720 executes instructions to provide some or all of the functionality described above as being provided by a network node 115, memory 730 stores the instructions executed by processing circuitry 720, and network interface 740 communicates signals to backend network components, such as a gateway, switch, router, Internet, Public Switched Telephone Network (PSTN), core network nodes or radio network controllers, etc.

Processing circuitry 720 may include any suitable combination of hardware and software implemented in one or more modules to execute instructions and manipulate data to perform some or all of the described functions of network node 115, such as those described herein. In some embodiments, processing circuitry 720 may include, for example, one or more computers, one or more central processing units (CPUs), one or more microprocessors, one or more applications, and/or other logic.

Memory 730 is generally operable to store instructions, such as a computer program, software, an application including one or more of logic, rules, algorithms, code, tables, etc. and/or other instructions capable of being executed by a processor. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 740 is communicatively coupled to processing circuitry 720 and may refer to any suitable device operable to receive input for network node 115, send output from network node 115, perform suitable processing of the input or output or both, communicate to other devices, or any combination of the preceding. Network interface 740 may include appropriate hardware (e.g., port, modem, network interface card, etc.) and software, including protocol conversion and data processing capabilities, to communicate through a network.

Other embodiments of network node 115 may include additional components beyond those shown in FIG. 10 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 11:
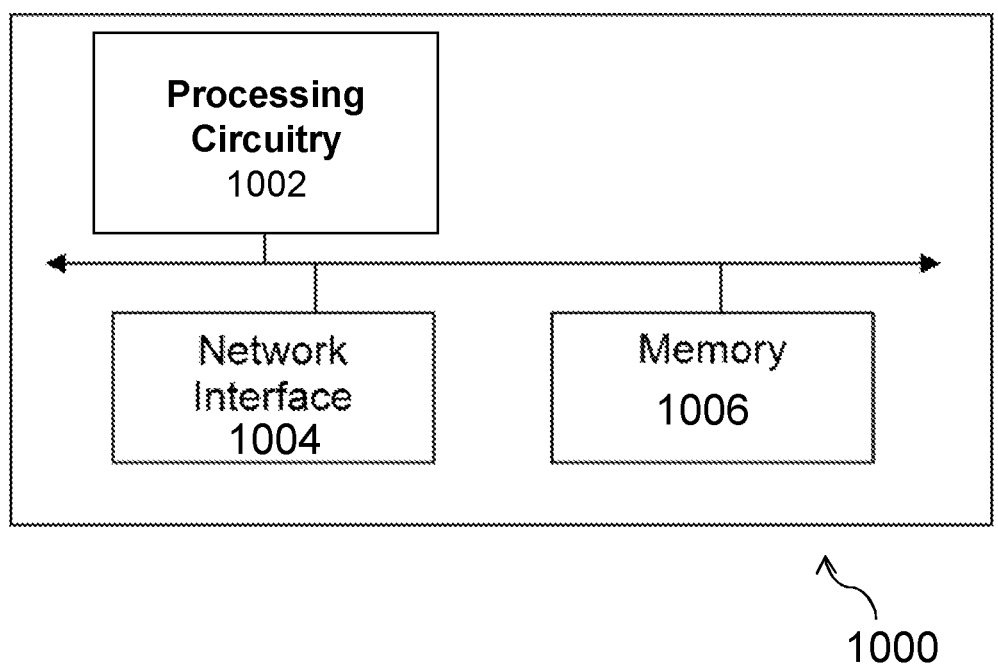
FIG. 11 illustrates an example radio network controller or core network node, according to certain embodiments.

FIG. 11 illustrates an example radio network controller or core network node 800, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node includes processing circuitry 802 (e.g., which may include one or more processors), network interface 804, and memory 806. In some embodiments, processing circuitry 802 executes instructions to provide some or all of the functionality described above as being provided by the network node, memory 806 stores the instructions executed by processing circuitry 802, and network interface 804 communicates signals to any suitable node, such as a gateway, switch, router, Internet, Public Switched Telephone Network (PSTN), network nodes 115, radio network controllers or core network nodes, etc.

Processing circuitry 802 may include any suitable combination of hardware and software implemented in one or more modules to execute instructions and manipulate data to perform some or all of the described functions of the radio network controller or core network node. In some embodiments, processing circuitry 802 may include, for example, one or more computers, one or more central processing units (CPUs), one or more microprocessors, one or more applications, and/or other logic.

Memory 806 is generally operable to store instructions, such as a computer program, software, an application including one or more of logic, rules, algorithms, code, tables, etc. and/or other instructions capable of being executed by a processor. Examples of memory 806 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 804 is communicatively coupled to processing circuitry 802 and may refer to any suitable device operable to receive input for the network node, send output from the network node, perform suitable processing of the input or output or both, communicate to other devices, or any combination of the preceding. Network interface 804 may include appropriate hardware (e.g., port, modem, network interface card, etc.) and software, including protocol conversion and data processing capabilities, to communicate through a network.

Other embodiments of the network node may include additional components beyond those shown in FIG. 11 that may be responsible for providing certain aspects of the network node's functionality, including any of the functionality described above and/or any additional functionality (including any functionality necessary to support the solution described above).

Figure 12:
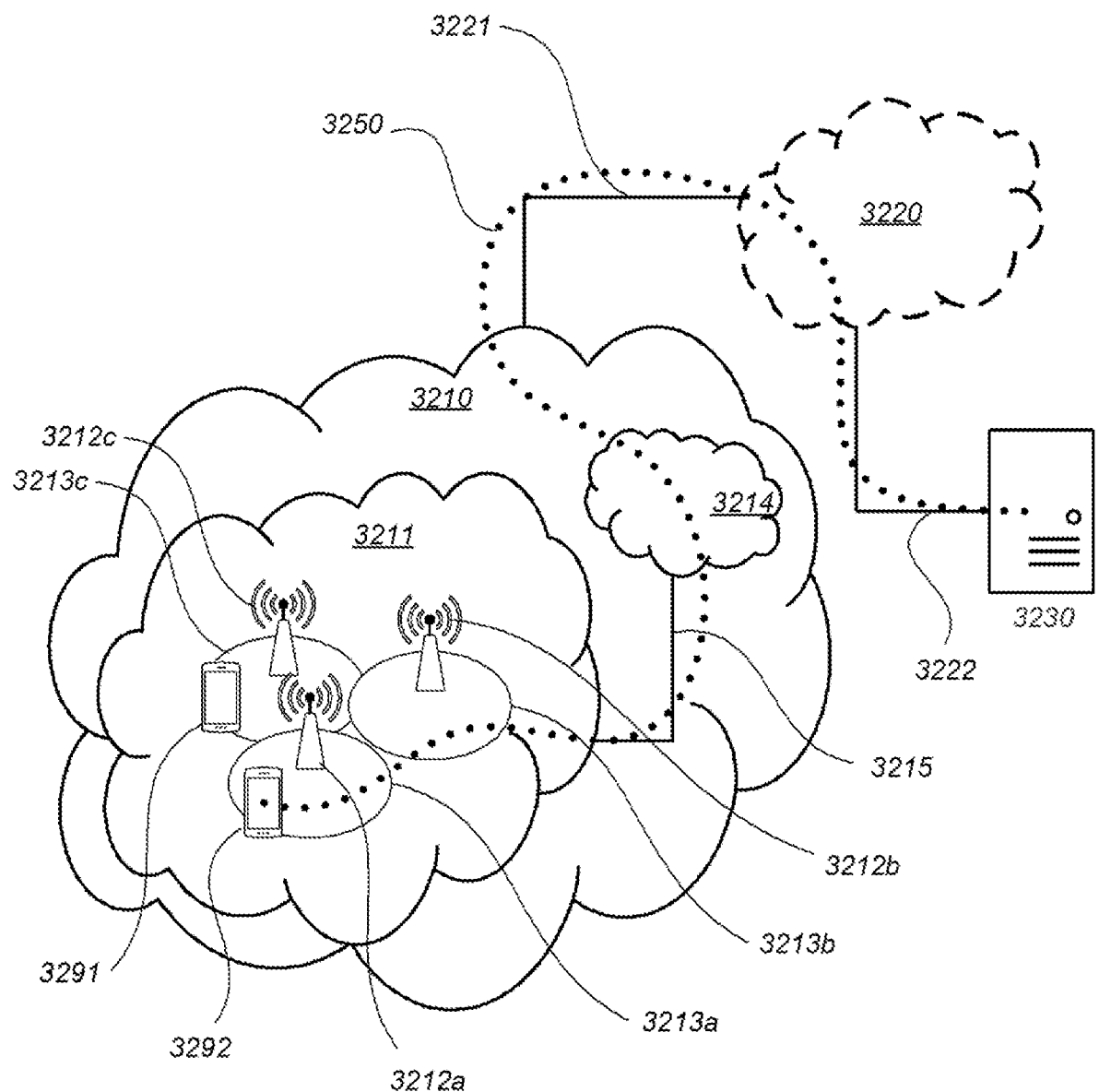
FIG. 12 illustrates a telecommunication network connected via an intermediate network to a host computer, according to certain embodiments.

FIG. 12 schematically illustrates a telecommunication network connected via an intermediate network to a host computer, according to certain embodiments. In accordance with an embodiment, a communication system includes a telecommunication network 3310, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3310 is itself connected to a host computer 3340, which may be embodied in the hardware and/or software of a standalone server, a cloud-implemented server, a distributed server or as processing resources in a server farm. The host computer 3340 may be under the ownership or control of a service provider, or may be operated by the service provider or on behalf of the service provider. The connections 3221, 3222 between the telecommunication network 3310 and the host computer 3340 may extend directly from the core network 3214 to the host computer 3340 or may go via an optional intermediate network 3320. The intermediate network 3320 may be one of, or a combination of more than one of, a public, private or hosted network; the intermediate network 3320, if any, may be a backbone network or the Internet; in particular, the intermediate network 3320 may comprise two or more sub-networks (not shown).

The communication system of FIG. 12 as a whole enables connectivity between one of the connected UEs 3291, 3292 and the host computer 3340. The connectivity may be described as an over-the-top (OTT) connection 3250. The host computer 3340 and the connected UEs 3291, 3292 are configured to communicate data and/or signaling via the OTT connection 3250, using the access network 3211, the core network 3214, any intermediate network 3320 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3340 to be forwarded (e.g., handed over) to a connected UE 3291. Similarly, the base station 3212 need not be aware of the future routing of an outgoing uplink communication originating from the UE 3291 towards the host computer 3340.

Figure 13:
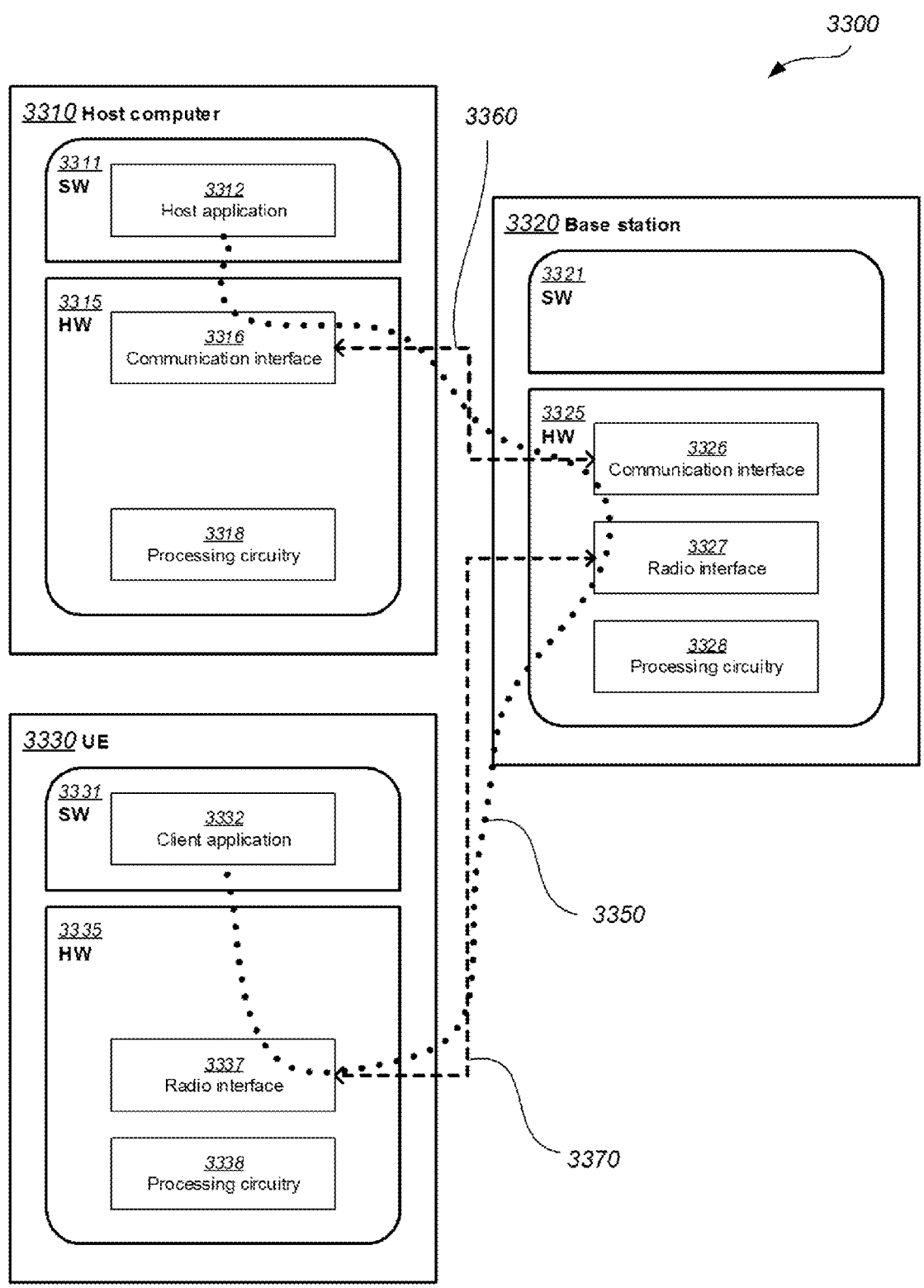
FIG. 13 illustrates a host computer communicating via a base station with a user equipment over a partially wireless connection, according to certain embodiments.

FIG. 13 is a generalized block diagram of a host computer communicating via a base station with a user equipment over a partially wireless connection, according to certain embodiments. Example implementations, in accordance with an embodiment, of the UE, base station and host computer discussed in the preceding paragraphs will now be described with reference to FIG. 13. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 11) served by the base station 3320. The communication interface 3326 may be configured to facilitate a connection 3360 to the host computer 3310. The connection 3360 may be direct or it may pass through a core network (not shown in FIG. 13) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions.

The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

It is noted that the host computer 3310, base station 3320 and UE 3330 illustrated in FIG. 13 may be identical to the host computer 3340, one of the base stations 3212a, 3212b, 3212c and one of the UEs 3291, 3292 of FIG. 12, respectively. This is to say, the inner workings of these entities may be as shown in FIG. 13 and independently, the surrounding network topology may be that of FIG. 12.

In FIG. 13, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate and/or latency and thereby provide benefits such as reduced user waiting time, relaxed restriction on file size, and/or better responsiveness.

A measurement procedure may be provided for the purpose of monitoring data rate and/or latency, and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 14:
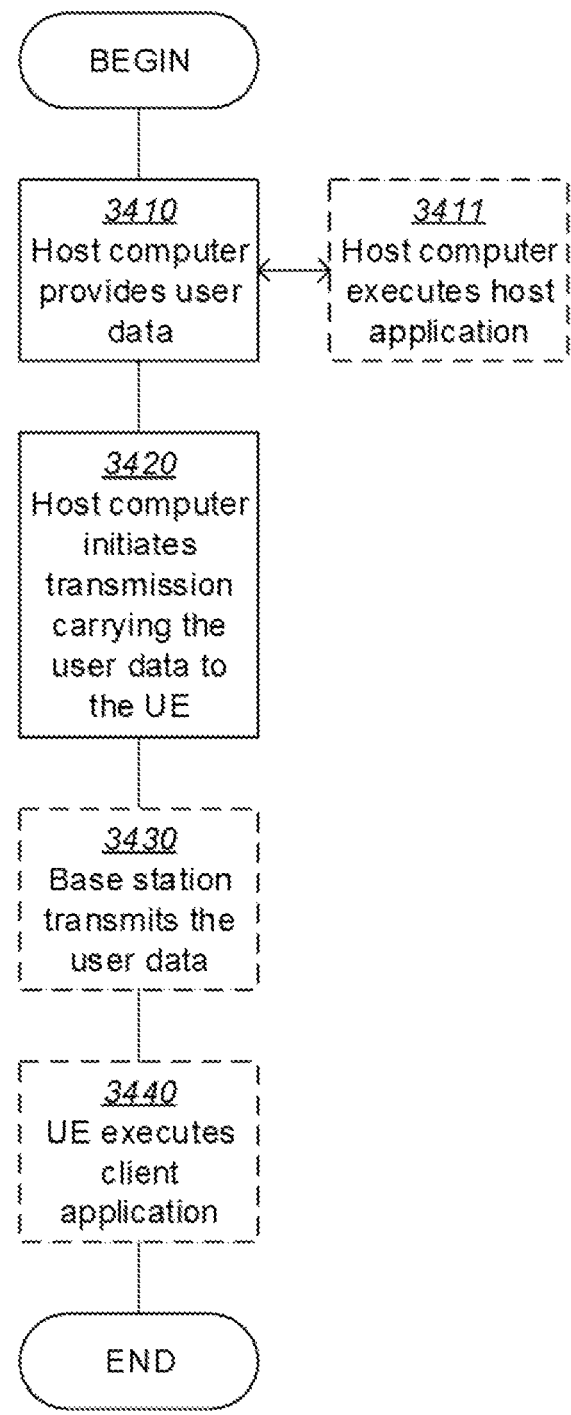
FIG. 14 illustrates a method implemented in a communication system, in accordance with one embodiment.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 15:
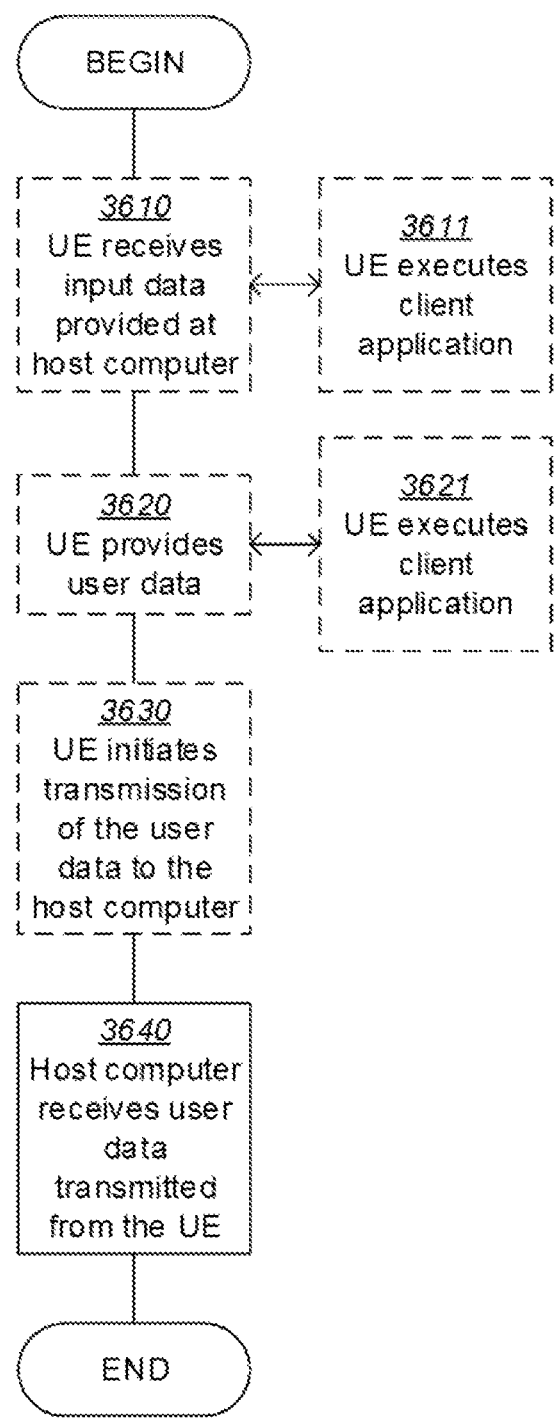
FIG. 15 illustrates another method implemented in a communication system, in accordance with one embodiment.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

EXAMPLE EMBODIMENTS

Embodiment 1

A method by a distribution node for location aware scheduling comprises:
  determining information about a condition associated with a packet;
  adjusting at least one Quality of Service (QoS) parameter based on the information about the condition; and
  using the at least one QoS parameter to perform an operation related to a transmission of the packet.

Embodiment 2

The method of embodiment 1, wherein using the at least one QoS parameter to perform an operation related to a transmission of the packet comprises scheduling the packet for transmission to a receiver based on the at least one adjusted QoS parameter.

Embodiment 3

The method of any of embodiments 1 to 2, wherein using the at least one QoS parameter to perform an operation related to a transmission of the packet comprises performing a resource allocation procedure based on the at least one adjusted QoS parameter.

Embodiment 4

The method of any of embodiments 1 to 3, wherein the at least one QoS parameter to perform an operation related to a transmission of the packet comprises transmitting the at least one adjusted QoS parameter to another radio node.

Embodiment 5

The method of any of embodiments 1 to 4, wherein using the at least one QoS parameter to perform an operation related to a transmission of the packet comprises selecting at least one radio bearer for the packet based on the at least one adjusted QoS parameter.

Embodiment 6

The method of any of embodiments 1 to 5, wherein:
  the condition comprises delivering the packet before a vehicle approaches a geographical area that is relevant for the data packet; and
  adjusting the at least one QoS parameter comprises deriving a packet-specific QoS requirement by comparing the geographical area with a position of an intended receiver of the packet.

Embodiment 7

The method of embodiment 8, wherein the packet-specific QoS requirement relates to a maximum delivery latency or reliability.

Embodiment 8

The method of any of embodiments 1 to 5, wherein:
  the condition comprises delivering the packet at an expected time for an intended receiver to reach a geographical area that is relevant to the packet; and
  wherein using the at least one QoS parameter to perform an operation related to a transmission of the packet comprises selecting at least one resource for transmission of the packet within a future time window that is a function of the expected time for the intended receiver to reach the geographical area that is relevant to the packet.

Embodiment 9

The method of any of embodiments 1 to 5 wherein:
  the condition comprises delivering the packet before a vehicle has moved over a certain distance relative to when the packet was generated or relative to a position when the packet reached the radio node.

Embodiment 10

The method of any of embodiments 1 to 9, wherein the distribution node comprises a wireless device.

Embodiment 11

The method of any of embodiment 1 to 9, wherein the distribution node comprises a network node.

Embodiment 12

A computer program product comprising a non-transitory computer readable medium storing computer readable program code, the computer readable program code comprises program code for performing any of the methods of embodiments 1 to 9.

Embodiment 13

A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the base station performs
    determining information about a condition associated with a packet;
    adjusting at least one Quality of Service (QoS) parameter based on the information about the condition; and
    using the at least one QoS parameter to perform an operation related to a transmission of the packet.

Embodiment 14

The method of embodiment 13, further comprising:
  at the base station, transmitting the user data.

Embodiment 15

The method of embodiment 14, wherein the user data is provided at the host computer by executing a host application, the method further comprising:
  at the UE, executing a client application associated with the host application.

Embodiment 16

A communication system including a host computer comprising:
  a communication interface configured to receive user data originating from a transmission from a user equipment (UE) to a base station,
  wherein the UE comprises a radio interface and processing circuitry, the UE's processing circuitry configured to:
    determine information about a condition associated with a packet;
    adjust at least one Quality of Service (QoS) parameter based on the information about the condition; and
    use the at least one QoS parameter to perform an operation related to a transmission of the packet.

Embodiment 17

The communication system of embodiment 16, further including the UE.

Embodiment 18

The communication system of embodiment 17, further including the base station, wherein the base station comprises a radio interface configured to communicate with the UE and a communication interface configured to forward to the host computer the user data carried by a transmission from the UE to the base station.

Embodiment 19

The communication system of embodiments 17 or 18, wherein:
  the processing circuitry of the host computer is configured to execute a host application; and
  the UE's processing circuitry is configured to execute a client application associated with the host application, thereby providing the user data.

Embodiment 20

The communication system of embodiments 17 or 18, wherein:
  the processing circuitry of the host computer is configured to execute a host application, thereby providing request data; and
  the UE's processing circuitry is configured to execute a client application associated with the host application, thereby providing the user data in response to the request data.

Embodiment 21

A distribution node for location aware scheduling, the radio comprising:
  memory operable to store instructions; and
  processing circuitry operable to execute the instructions to cause the radio node to:
    determine information about a condition associated with a packet;
    adjust at least one Quality of Service (QoS) parameter based on the information about the condition; and
    use the at least one QoS parameter to perform an operation related to a transmission of the packet.

Embodiment 22

The distribution node of embodiment 21, wherein using the at least one QoS parameter for the transmission comprises schedule the packet for transmission to a receiver.

Embodiment 23

The distribution node of any of embodiments 21 to 22, wherein using the at least one QoS parameter for the transmission comprises performing a resource allocation procedure based on the at least one QoS parameter.

Embodiment 24

The distribution node of any of embodiments 21 to 23, wherein using the at least one QoS parameter for the transmission transmitting the at least one adjusted QoS parameter to another radio node.

Embodiment 25

The distribution node of any of embodiments 21 to 24, wherein using the at least one QoS parameter for the transmission comprises selecting at least one radio bearer for the packet based on the at least one adjusted QoS parameter.

Embodiment 26

The distribution node of any of embodiments 21 to 25, wherein:
  the condition comprises delivering the packet before a vehicle approaches a geographical area that is relevant for the data packet; and
  adjusting the at least one QoS parameter comprises deriving a packet-specific QoS requirement by comparing the geographical area with a position of an intended receiver of the packet.

Embodiment 27

The distribution node of embodiment 26, wherein the packet-specific QoS requirement relates to a maximum delivery latency or reliability.

Embodiment 28

The distribution node of any of embodiments 21 to 25, wherein:
  the condition comprises delivering the packet at an expected time for an intended receiver to reach a geographical area that is relevant to the packet; and
  using the at least one QoS parameter to perform an operation related to a transmission of the packet comprises selecting at least one resource for transmission of the packet within a future time window that is a function of the expected time for the intended receiver to reach the geographical area that is relevant to the packet.

Embodiment 29

The distribution node of any of embodiments 21 to 25 wherein:
  the condition comprises delivering the packet before a vehicle has moved over a certain distance relative to when the packet was generated or relative to a position when the packet reached the radio node.

Embodiment 30

The distribution node of any of embodiments 21 to 29, wherein the radio node comprises a wireless device.

Embodiment 31

The distribution node of any of embodiment 21 to 29, wherein the radio node comprises a network node.

Embodiment 32

A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to:
determine information about a condition associated with a packet; adjust at least one Quality of Service (QoS) parameter based on the information about the condition; and
use the at least one QoS parameter to perform an operation related to a transmission of the packet.

Embodiment 33

The communication system of embodiment 32, further including the base station.

Embodiment 34

The communication system of embodiment 33, further including the UE, wherein the UE is configured to communicate with the base station.

Embodiment 35

The communication system of embodiment 34, wherein:
the processing circuitry of the host computer is configured to execute a host application, thereby providing the user data; and
the UE comprises processing circuitry configured to execute a client application associated with the host application.

Embodiment 36

A communication system including a host computer comprising:
processing circuitry configured to provide user data; and
a communication interface configured to forward user data to a cellular network for transmission to a user equipment (UE),
wherein the UE comprises a radio interface and processing circuitry, the UE's processing circuitry configured to:
determine information about a condition associated with a packet;
adjust at least one Quality of Service (QoS) parameter based on the information about the condition;
use the at least one QoS parameter to perform an operation related to a transmission of the packet.

Embodiment 37

The communication system of embodiment 36, further including the UE.

Embodiment 38

The communication system of embodiment 37, wherein the cellular network further includes a base station configured to communicate with the UE.

Embodiment 39

The communication system of embodiment 37 or 38, wherein:
the processing circuitry of the host computer is configured to execute a host application, thereby providing the user data; and
the UE's processing circuitry is configured to execute a client application associated with the host application.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

| ABBREVIATIONS | |
|---|---|
| Abbreviation | Explanation |
| CAM | Cooperative Awareness Message |
| FTP | File Transfer Protocol |
| HD | High Definition |
| KPI | Key Performance Indicator |
| NR | New Radio |
| QCI | QoS Class Identifier |
| QoS | Quality of service |
| V2X | Vehicle-to-everything |
| VoIP | Voice Over Internet Protocol |

The invention claimed is:
1. A method by a distribution node for location aware scheduling comprises:
determining information about a condition associated with a packet, wherein the condition comprises delivery of the packet at a specific time;

adjusting at least one Quality of Service, QoS, parameter based on the information about the condition associated with the packet; and scheduling the packet for transmission to a receiver based on the at least one adjusted QoS parameter.

2. The method of claim 1, wherein:

the condition comprises delivering the packet to the receiver before a vehicle associated with the receiver approaches a geographical area that is relevant to the packet; and adjusting the at least one QoS parameter comprises deriving a packet-specific QoS requirement by comparing the geographical area that is relevant for the packet with a current position of the receiver of the packet.

3. The method of claim 2, wherein the packet-specific QoS requirement relates to a maximum delivery latency or reliability.

4. The method of claim 1, wherein:

the condition comprises delivering the packet at a time when the receiver is expected to reach a geographical area that is relevant to the packet; and scheduling the packet for transmission to a receiver based on the at least one adjusted QoS parameter comprises selecting at least one resource for transmission of the packet within a future time window that is a function of the time when the receiver is expected to reach the geographical area that is relevant to the packet.

5. The method of claim 1 wherein:

the condition comprises delivering the packet before a vehicle in which the receiver is traveling has moved over a certain distance relative to when the packet was generated or relative to a position when the packet reached a network node.

6. The method of claim 1, wherein scheduling the packet for transmission to the receiver comprises performing a resource allocation procedure based on the at least one adjusted QoS parameter.

7. The method of claim 1, further comprising transmitting the at least one adjusted QoS parameter to another distribution node.

8. The method of claim 1, wherein scheduling the packet for transmission to the receiver comprises selecting at least one radio bearer for the packet based on the at least one adjusted QoS parameter, and/or wherein scheduling the packet for transmission to the receiver comprises selecting at least one flow for the packet based on the at least one adjusted QoS parameter.

9. The method of claim 1, wherein the packet comprises at least one of:

a map;

a traffic-related notification;

a Cooperative Awareness Message, CAM, comprising vehicle status information; and a Decentralized Environmental Notification Message, DENM, related to an event.

10. A distribution node for location aware scheduling, the radio distribution node comprising:

memory operable to store instructions; and processing circuitry operable to execute the instructions to cause the distribution node to:

determine information about a condition associated with a packet, wherein the condition comprises delivery of the packet at a specific time;

adjust at least one Quality of Service, QoS, parameter based on the information about the condition associated with the packet; and schedule the packet for transmission to a receiver based on the at least one adjusted QoS parameter.

* * * * *